United States Patent

[11] 3,613,727

| [72] | Inventor | Pierre P. Orieux<br>Paris, France |
|---|---|---|
| [21] | Appl. No. | 850,035 |
| [22] | Filed | Aug. 14, 1969 |
| [45] | Patented | Oct. 19, 1971 |
| [73] | Assignee | Compagnie Francais Des Petroles Societe Anonyme<br>Paris, France |

[54] TUBE-CONNECTING DEVICE
8 Claims, 7 Drawing Figs.

[52] U.S. Cl. .................................................. 137/614.17,
251/161
[51] Int. Cl. ...................................................... F16k 11/12
[50] Field of Search .......................................... 137/614.17,
614.16, 625.47; 251/309, 161, 149.2, 149.7

[56] References Cited
UNITED STATES PATENTS

| 1,211,975 | 1/1917 | Smith | 137/614.17 X |
| 1,078,252 | 11/1913 | Cacko | 137/614.17 X |
| 1,403,396 | 1/1922 | Erickson | 137/614.17 |
| 2,106,310 | 1/1938 | Warrick | 137/614.17 |
| 3,168,280 | 2/1965 | Mueller | 251/309 X |

Primary Examiner—M. Cary Nelson
Assistant Examiner—Michael O. Sturm
Attorney—Sughrue, Rothwell, Mion, Zinn & Macpeak ABSTRACT: A tube-connecting device which can be used to connect or disconnect tubes without requiring the use of auxiliary devices such as valves located upstream and downstream of the connection to stop the flow of liquids through the tubes. The tube-connecting device includes a movable jacket having openings therethrough placed between a fixed body to which is attached a first set of tubes and a removable body to which is attached a second set of tubes. The jacket may be rotated to block the passage of fluid from the fixed body to allow removal of the removable body and second set of tubes without the use of valves located upstream of the connection.

TUBE-CONNECTING DEVICE

BACKGROUND OF THE INVENTION

This invention relates to a device for connecting tubes and, more particularly, to a device which can be used to connect or disconnect tubes without requiring the use of auxiliary devices such as valves located upstream and downstream of the connection to stop the circulation of liquids through the tubes.

Often it is necessary to disconnect a measurement or control instrument from a conduit containing a liquid flowing therethrough for purposes of checking or performing maintenance on the instrument or for replacing the instrument. In order to perform this operation, it is necessary to close a control valve placed in the fluid conduit upstream from the instrument connection to prevent the escape of the liquid from the conduit after the instrument has been removed. In addition to closing a valve, a coupling joining the fluid conduit and the conduit attached to the instrument must be disconnected to enable the instrument to be removed.

This operation becomes somewhat involved when the measuring instrument or control instrument is connected in the fluid circuit of the liquid, rather than being connected at the end of a fluid channel. In such an instance, the instrument must be connected to the fluid channel by two tubes, on upstream from the instrument and one downstream to enable the fluid flow to continue after passing through the measuring or control device. It would therefore be necessary to disconnect two coupling devices and to close two valves, one located in the upstream conduit and another one located in the downstream conduit. It is therefore a rather lengthy operation to close the multiplicity of valves and disconnect the multiple couplings required for removal of a measuring or control instrument or the like from a fluid conduit.

SUMMARY OF THE INVENTION

An object of this invention is to provide a device for the connection of at least one of a first series of tubes to at least one of a second series of tubes, said connection device incorporating the following:

a. A body having an inner surface with openings therein connected to passages within said body in communication with the above-mentioned first tube or tubes connected to openings on the outer surface of said body;

b. A movable jacket means in contact with the inner surface of said body, said jacket having a plurality of openings therethrough and capable of being moved into two positions, the first position allowing the openings in the inner surface of the above-mentioned body to be aligned with the opening or openings of the jacket, and to cause the jacket to close the openings in the inner wall of the body when the jacket is placed in the second position;

c. Removable body located adjacent the surface of the jacket opposite the surface in contact with the inner wall of the first body, with said removable body having at least one opening connected with said second series of tubes and being located in alignment with the corresponding openings in the jacket;

d. Means for holding the jacket against the first body and an additional means for holding the removable body against the jacket.

Another object of this invention is to provide a simple and convenient device for connecting or disconnecting a first series of tubes to a second series of tubes without requiring the use of separate valves in each channel leading to the connecting means, by rotating the jacket to block the fluid flow from the first series of tubes, followed by removal of the removable body from the jacket.

Another object of this invention is to provide a device of this type in which the body carrying the first series of tubes has a cone-shaped internal surface on which the movable jacket rests, to enable a connection to be made in a simple and rapid fashion by placing the removable body on the jacket and rotating the jacket against the cone-shaped surface.

Another object of this invention is to provide a device of the preceding type in which each tube of each of the two series of tubes is in fluid communication with the conical surface corresponding to it on a separate level, an upper and lower circular groove formed in the corresponding conical surface, with each groove having a seal placed therein to separate adjacent levels of the removable body to prevent leakage from one channel to another, and to enable the removable body to be removed without damaging the seals.

Another object of the invention is to provide a means to seal the connection between the tubes in case of a slight shifting of the removable body with respect to the jacket.

Another object of this invention is to provide a circular seal around the openings located on the cone-shaped surfaces of the two bodies to reduce the area against which the fluid pressure is being exerted.

Another object of this invention is to provide a circular groove around the circular seals and connected to a conduit leading to the outside of the connecting device to allow any liquid lost due to a defective seal to be carried to the outside of the connecting device.

Another object of this invention is to provide a means for causing the jacket to be lifted while being rotated to prevent unnecessary wear of the sealing surfaces when the jacket is being moved from its open position to its closed position.

Another object of this invention is to provide an opening through the bottom of the outer body to prevent the accumulation of deposits therein and to facilitate the use of a guide means for positioning the removable body.

Other objects and characteristics will appear in the following description and figures.

DETAILED DESCRIPTION OF THE INVENTION

Figure 2:
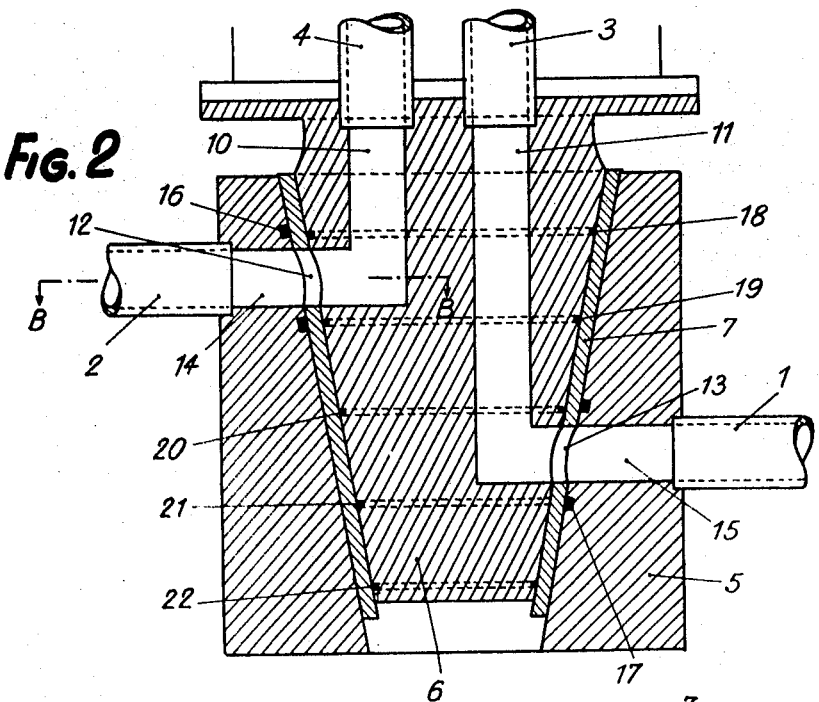
FIG. 2 is an elevation view of the cross section taken along line A—A, in FIG. 1.
Figure 1:
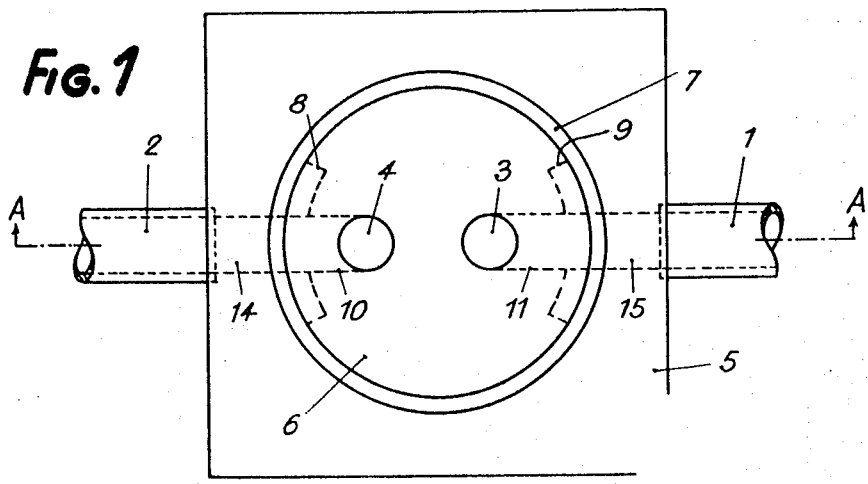
FIG. 1 represents a schematic plan view of the connecting device.

Referring now to the drawings, and particularly FIGS. 1 and 2, a single fluid channel, including an upstream tube element 1 and a downstream tube element 2 supplies fluid to a measurement or control device, not shown but connected to conduits 3 and 4. Normally, without the use of the subject invention shown in FIG. 1, the removal of the apparatus schematically illustrated by conduits 3 and 4 from the fluid channel would require the closing of a valve located in each of tubes 1 and 2, as well as the dismantling of the connections made between tubes 1 and 3 and tubes 2 and 4.

According to a preferred embodiment of the present invention, tubes 1 and 2 are connected to the external surface of the external body 5, and tubes 3 and 4 are rigidly connected to the removable internal portion or body 6. A jacket 7 having openings 12 and 13 therethrough is placed between external body 5 and internal body 6. Jacket 7 can be rotated either directly, or indirectly in conjunction with the rotation of internal body 6. Recesses 8 and 9 are provided on the surface of internal body 6 around the openings of conduits 10 and 11 in fluid communication with tubes 4 and 3, respectively. As seen in FIG. 2, conduits 10 and 11 are aligned with openings 12 and 13 of jacket 7. Similarly, conduits 15 and 14 located in external body 5 connect tubes 1 and 2 to the jacket openings 13 and 12, respectively, in FIG. 2.

In order to insure a perfect seal, grooves containing seals 16 and 17 are located around the openings of conduits 14 and 15 in the conical surface of body 5. Similarly, grooves 18 and 19 having seals placed therein are cut circumferentially around the conical surface of removable internal body 6, and are located above and below the opening of conduit 10 on the conical surface. Similarly, seal-containing grooves 20 and 21 are placed circumferentially in the conical surface of removable body 6 above and below the opening of conduit 11. An additional groove and seal 22 is located at the bottom of the conical surface of removable body 6 to prevent any external liquid from passing between the base of jacket 7 and internal body 6. If necessary, additional sealing protection and durability may be obtained by placing shoulder bushings against each of the seals located in their corresponding grooves.

In order to facilitate the positioning of the internal body 6 connected, for example, to a measurement or control apparatus by means of conduits 3 and 4, with respect to conduits 14 and 15 of the external body to obtain fluid communication therewith, there is provided, according to the invention, a recess 8 which has been made in the conical surface of removable body 6 around the opening of conduit 10. The use of an enlarged recess 8 around the opening of conduit 10 compensates for any misalignment of conduits 10 and 14 to enable fluid communication to be obtained therebetween.

Figures 3, 4:
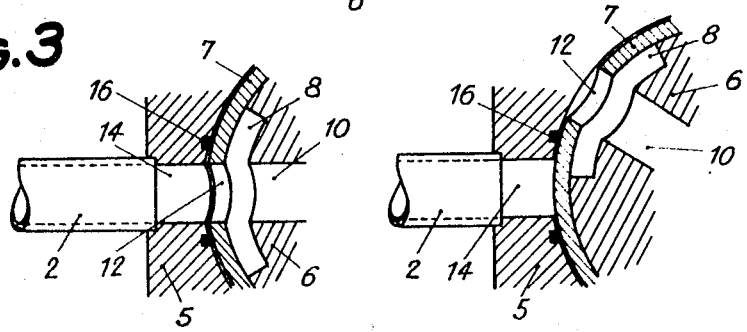
FIG. 3 is a plan view of the horizontal cross section taken along line B—B in FIG. 2, showing the passages in their aligned positions.
FIG. 4 shows the positions of the elements in FIG. 3 after rotation of the central element to a closed position.

In operation of the device, according to the preferred embodiment, when it is desired to close off conduits 14 and 15, jacket 7 is rotated through a predetermined angle, such as the one indicated by the intersection of the longitudinal axes of tubes 10 and 14 in FIG. 4, thus causing the openings 12 and 13 in the wall of jacket 7 to be rotated out of communication with conduits 14 and 15, respectively, so that these conduits are blocked by the surface of jacket 7, thereby interrupting the connection between tubes 2 and 4 and tubes 1 and 3, respectively. As seen in FIG. 1, it is sufficient for tube 2 to be disconnected from conduit 10 in order to obtain the same results with respect to tube 1 and conduit 3.

It is clear that the device as described above can be readily applied to the connection of any number of tubes.

Figure 5:
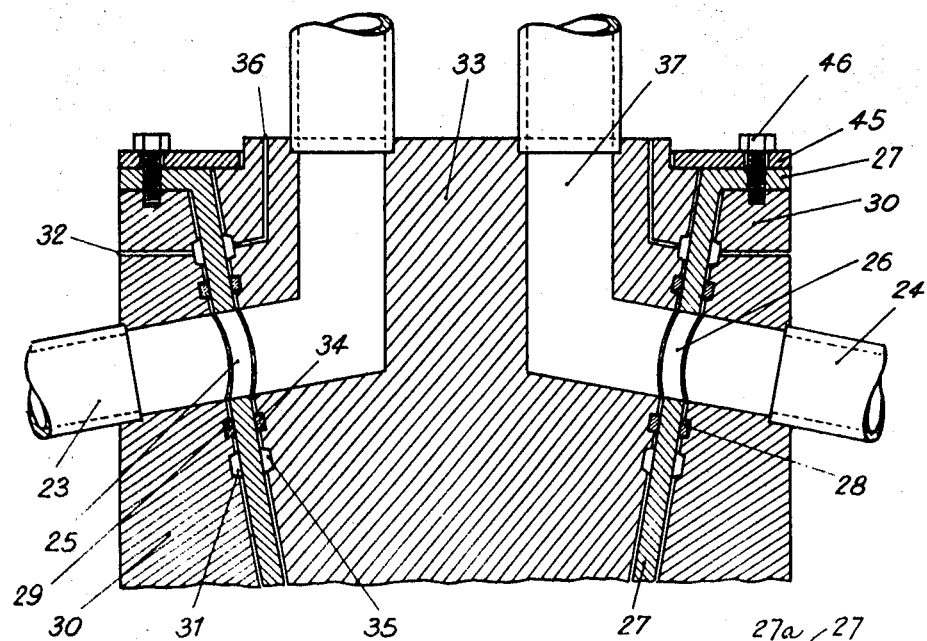
FIG. 5 is a vertical cross section of a variation of the connecting device of FIG. 2.

A variation of the sealing means used in removable body 6 is shown in FIG. 5. A groove and seal similar to the one shown at 16, in FIG. 2, may be placed around the opening of conduit 10 in the removable body 6. Recesses 8 and 9 may be eliminated when such a seal construction is used around the openings in removable body 6, thus making it possible to precisely fix the position of removable body 6 with respect to jacket 7.

When the modified seal structure is used, the conduit openings on the conical surfaces may be situated on the same level. As shown in FIG. 5, tubes 23 and 24, in communication with openings 25 and 26 of jacket 27, are situated on the same level. Circular seals 28 and 29, placed in their respective grooves in external body 30, prevent the escape of any fluid from the junctions of tubes 23 and 24 with openings 25 and 26 of the jacket 27.

A circular groove 31 is located in external body 30 around seals 28 and 29. A channel 32 connects the groove to the outside of body 30. Thus, any leakage that might come from seal 29 is channeled directly to the outside of the connecting device.

A similar circular groove 35 is provided around the seal 34 located in the internal body 33. Channel 36 connects groove 35 to the outside of the device to allow any leakage around seal 34 to be carried to the outside of removable body 33. A similar channel-and-groove arrangement is provided for conduit 37 in communication with the opening 26 of jacket 27.

This modification of the sealing arrangement of the connecting device makes it possible to eliminate any leakage of liquid from one channel into another, while still providing for a reduction of the space required by the new arrangement of tubes having their connections being located at the same level.

Furthermore, when the liquids passing through the fluid channels are subjected to high pressures, the use of this modification of the sealing arrangement prevents high forces from being exerted against the walls of the internal body.

In order to facilitate the removal of the internal body when the connecting device of the subject invention is exposed to an atmosphere of high pressure, such as being used in an underwater application, the jacket and the external fixed body are provided with openings in their lower portions so that the pressure being exerted against the upper and lower surfaces of the internal body are practically the same.

Figure 6:
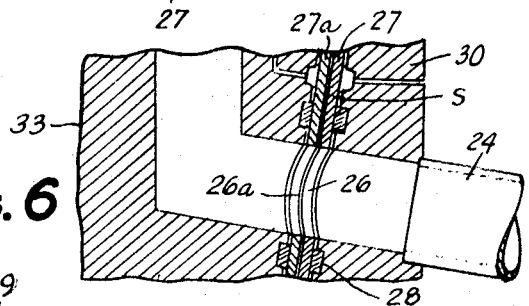
FIG. 6 is a partial cross-sectional view showing a modification with two jackets.
Figure 7:
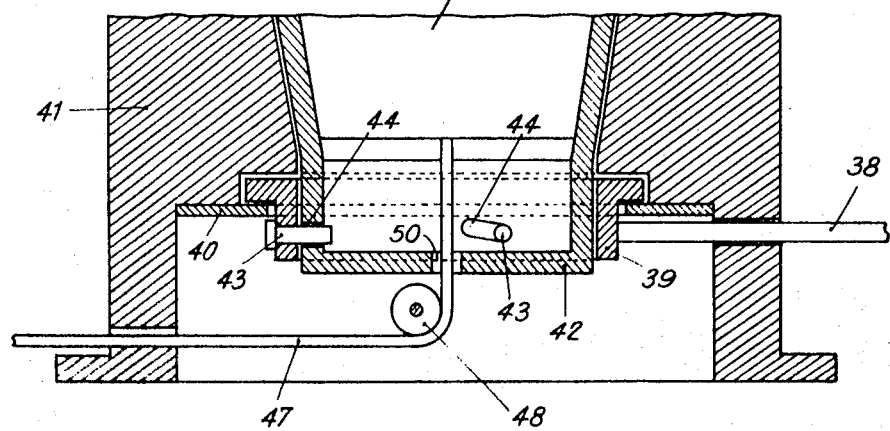
FIG. 7 is a schematic cross section view along line A—A in FIG. 1, showing the control for the rotation of the jacket of the invention.

One embodiment of the device for the control of the rotation of the jacket of the preferred embodiment is shown in FIG. 6. The rotation control mechanism of FIG. 7 incorporates a lever 38 for causing rotation of jacket 42. Lever 38 is attached to a collar 39, which rests on a plate 40 attached to external body 41. Collar 39 rotates freely on plate 40 and surrounds the bottom of jacket 42. A plurality of pins 43, rigidly attached to collar 39, extend through angled slots 44, located around the lower periphery of jacket 42. Upon movement of lever 38, collar 39 slides on plate 40 and, as shown in FIG. 7, causes jacket 42 to be raised slightly due to the shape and inclination of holes 44. The rotation of the jacket 42 occurs when pins 43 move against the lowest end of holes 44, thus causing the rotation to take place after the jacket has been raised. When movement of lever 38 is stopped, jacket 42 is lowered and its weight is once again carried by external body 41. From the foregoing it may be seen that it is possible to cause jacket 42 to rotate by causing it to first undergo an upward movement, which enables the jacket to separate itself from body 41, thus facilitating its rotation. After rotation, the jacket falls back into place due to its own weight, when holes 44 slide on pins 43.

When the jacket is placed in the fluid connection position, it can be held in place by means of retaining ring 45, as shown in FIG. 5, attached to the external body 30 and above removable body 33 by means of bolts 46. Thus, if it is desired to disconnect a first assembly of tubes from a second assembly, the retaining ring 45 is first removed and lever 38, shown in FIG. 7, is rotated to cause the jacket to rotate to a sealing position.

In the further modification shown in FIG. 6, an additional jacket seal 27a may be used to facilitate removal of the removable body 33 when it is desired to retain fluid or fluid pressure in the device connected to removable body 33. In this embodiment, a second jacket 27a having openings 26a therethrough corresponding to the openings 26 in jacket 27 is placed between jacket 27 and removable body 33. A seal S is positioned between the jacket 27 and additional jacket 27a to prevent leakage therebetween. When it is desired to remove removable body 33, jacket 27 and the additional jacket 27a are rotated to seal the openings in the external body 30 and the removable internal body 33, respectively. Thus, removable body 33, with the additional jacket 27a attached, may be removed from jacket 27, thereby enabling all conduits to remain sealed.

It is obvious that further modifications may be made within the scope of this invention. For example, lever 38 could be replaced by a mechanical rotating mechanism, such as a worm gear drive mechanism, and a control mechanism could be incorporated to prevent the rotation of the jacket until retaining ring 45 has been manually or automatically lifted. Additional modifications can be made to control the rotation of the jacket in response to its vertical position.

FIG. 6 discloses a further modification which includes a cable 47 attached to internal body 45 and which passes over pulley 48 through central opening 50 of jacket 42. This cable can be used as a guide means during the connection of the two series of tubes when the internal portion 49 is being vertically placed into the jacket 42. Such a device would be especially useful when the tubes to be connected are located under water.

A further modification could involve the use of a jacket having a series of openings and being capable of assuming at least two positions, one that would cause these openings to coincide with the openings of the conduits of the removable body and the other position closing off these conduits. Thus, after raising and rotation of the jacket applied on the external fixed body, the removable body could then be raised and rotated with respect to the jacket, on which it is supported, so as to close off the tubes of the removable body during its removal operation.

What is claimed is:

1. A device for connecting and disconnecting at least one tube to at least one other tube, said device comprising a fixed body having an internal opening therein, said internal opening having a curved surface configuration, at least one fluid conduit connecting the exterior of said fixed body with the curved surface of said internal opening, a removable body for placement in said internal opening of said fixed body, said movable body having a curved surface configuration corresponding to the configuration of said internal opening of said fixed body, said removable body having at least one fluid conduit therein for communication with said fluid conduit of said fixed body;

a movable jacket located between said fixed body and said removable body, said jacket having at least one opening therethrough corresponding to the openings of the conduits of said fixed body and said removable body for establishing fluid communication therebetween, said movable jacket having a first position for establishing fluid communication between the conduits of said fixed body and said removable body and at least one other position for interrupting fluid communication between the conduits of said fixed body and said removable body, each opening of said jacket being located on a different horizontal plane;

sealing means located on the curved surface of said internal opening of said fixed body and on the exterior surface of said removable body for preventing leakage of fluid from the fluid conduit therein, said sealing means located on the curved surface of said internal opening of said fixed body comprising a groove formed in said surface surrounding the opening of said fluid conduit thereat and having a seal located in said groove, said sealing means located on the exterior surface of said removable body comprising a plurality of parallel grooves located circumferentially about the exterior surface of said removable body and having a seal located therein, with each opening being located between said two consecutive grooves for preventing leakage of fluid from the fluid conduit therein.

2. A connecting device as claimed in claim 1, further comprising means for moving said jacket so that the openings in the internal surface of said fixed body are closed by the outer surface of said jacket, and a means for retaining said jacket in a conduit-closing position following the removal of said removable body.

3. A connecting device as claimed in claim 1, wherein the openings of the external surface of said removable body have an aperture located therearound, the surface of said aperture being greater than that of the openings of said jacket.

4. A connecting device as claimed in claim 1, wherein said internal surface of said fixed body, said jacket surfaces, and said surface of said removable body adjacent to said jacket are conical shaped.

5. A device for connecting and disconnecting at least one tube to at least one other tube, said device comprising, a fixed body having an internal opening therein, said internal opening having a curved surface, at least one fluid conduit connecting the exterior of said fixed body with the curved surface of said internal opening, a removable body for placement in said internal opening of said fixed body, said removable body having a curved exterior surface, said removable body having at least one conduit therein for communication with said fluid conduit of said fixed body, a movable jacket located between said fixed body and said removable body, said jacket having at least one opening therethrough corresponding to the openings of the conduits of said fixed body and said removable body for establishing fluid communication therebetween, said movable jacket having a first position for establishing fluid communication between the conduits of said fixed body and said removable body and at least one other position for interrupting fluid communication between the conduits of said fixed body and said removable body, said tubes to be connected for the passage of liquid therebetween being aligned with openings in said jacket situated on the same level, sealing means located on the curved surface of said internal opening of said fixed body and on the exterior surface of said removable body for preventing leakage of fluid from the fluid conduit therein, said sealing means incorporating seals having an oval shape in the plan view thereof, said seals being located in separate grooves surrounding the openings of said conduits in the internal surface of said fixed body and the surface of said movable body, each of said separate grooves located in the surfaces of said fixed body and said movable body being surrounded by an additional groove, said additional groove being connected by an individual conduit to the external surface of the body in which each of said additional grooves is located.

6. A connecting device as claimed in claim 1, further comprising an opening in said fixed body for communicating the lower portion of said movable body with the external environment when said fixed body, said jacket, and said removable body are placed in an assembled position.

7. A device for connecting and disconnecting one tube to at least one other tube, said device comprising a fixed body having an internal opening therein, at least one fluid conduit connecting the exterior of said fixed body with the surface of said internal opening, a removable body for placement in said internal opening of said fixed body, said removable body having at least one fluid conduit therein for communication with said fluid conduit of said fixed body, a movable jacket located between said fixed body and said removable body, said jacket having at least one opening therethrough corresponding to the opening of the conduit of said fixed body and said removable body for establishing fluid communication therebetween, said removable body having a first portion for establishing fluid communication between the conduits of said fixed body and said removable body and at least one other position for interrupting fluid communication between the conduits of said fixed body and said removable body, at least one sealing means located in one of said bodies for preventing leakage of fluid from the fluid conduit therein, wherein said fixed body further comprises a circular track attached to its lower portion, a movable member supported by said track, a plurality of pins attached to said movable member and in engagement with corresponding inclined slots located in said jacket, a means provided for moving said movable member from a first position, in which said pins cause said jacket to be placed in a lowered position, to a second position where said pins cause said jacket to be raised and rotated, thereby preventing any contact between the internal surface of said fixed body and said jacket during rotation of said jacket.

8. A connecting device as claimed in claim 5, further comprising a second jacket having openings corresponding to the openings of said first jacket and resting on said fixed body, said second jacket being placed between said first jacket and said removable body for support of said removable body while said connecting device is assembled.